No. 813,027. PATENTED FEB. 20, 1906.
E. TALBERT.
DISPENSING APPARATUS.
APPLICATION FILED JULY 13, 1904.
2 SHEETS—SHEET 2.
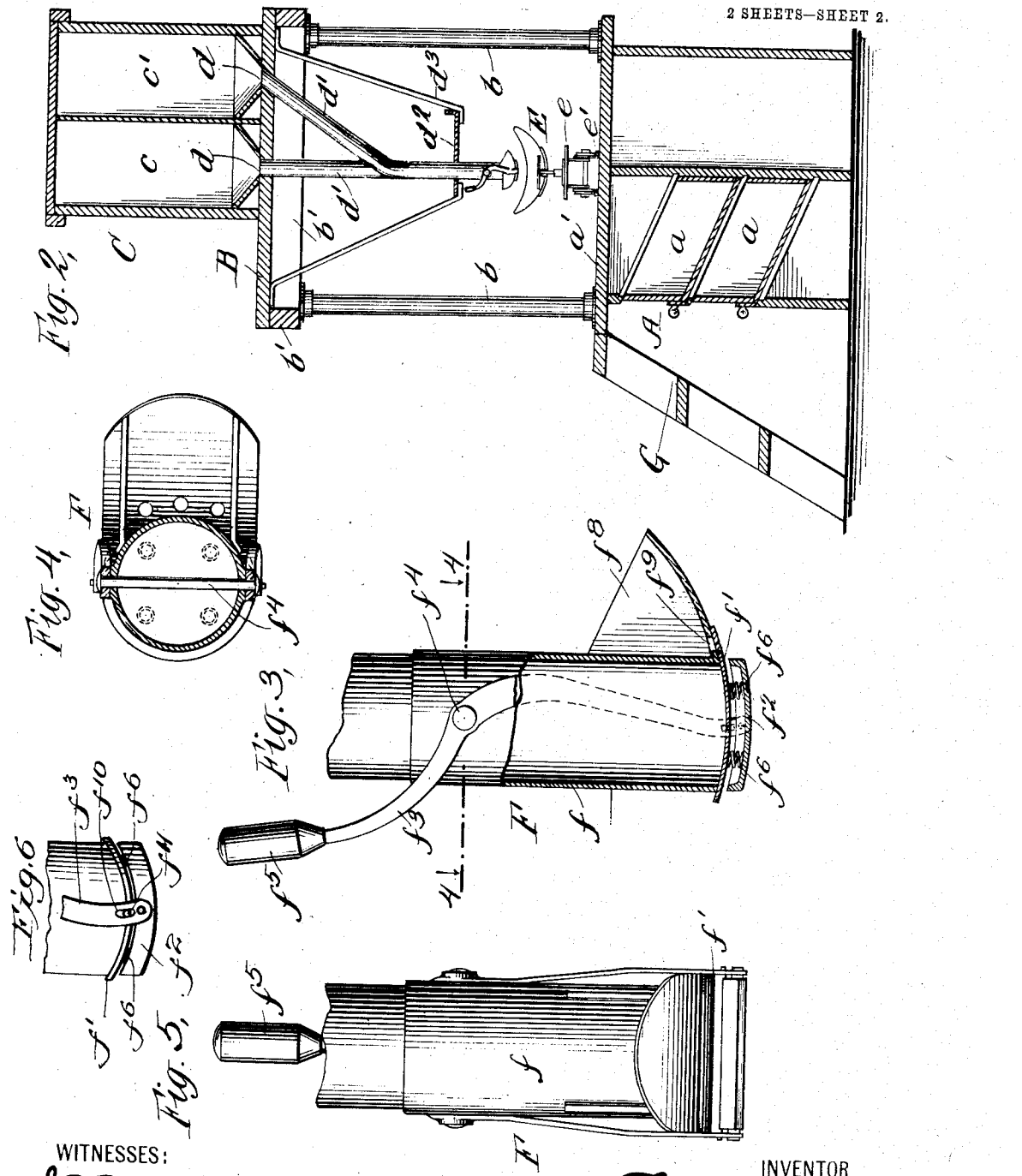
WITNESSES:
INVENTOR
Emmett Talbert
BY
ATTORNEYS

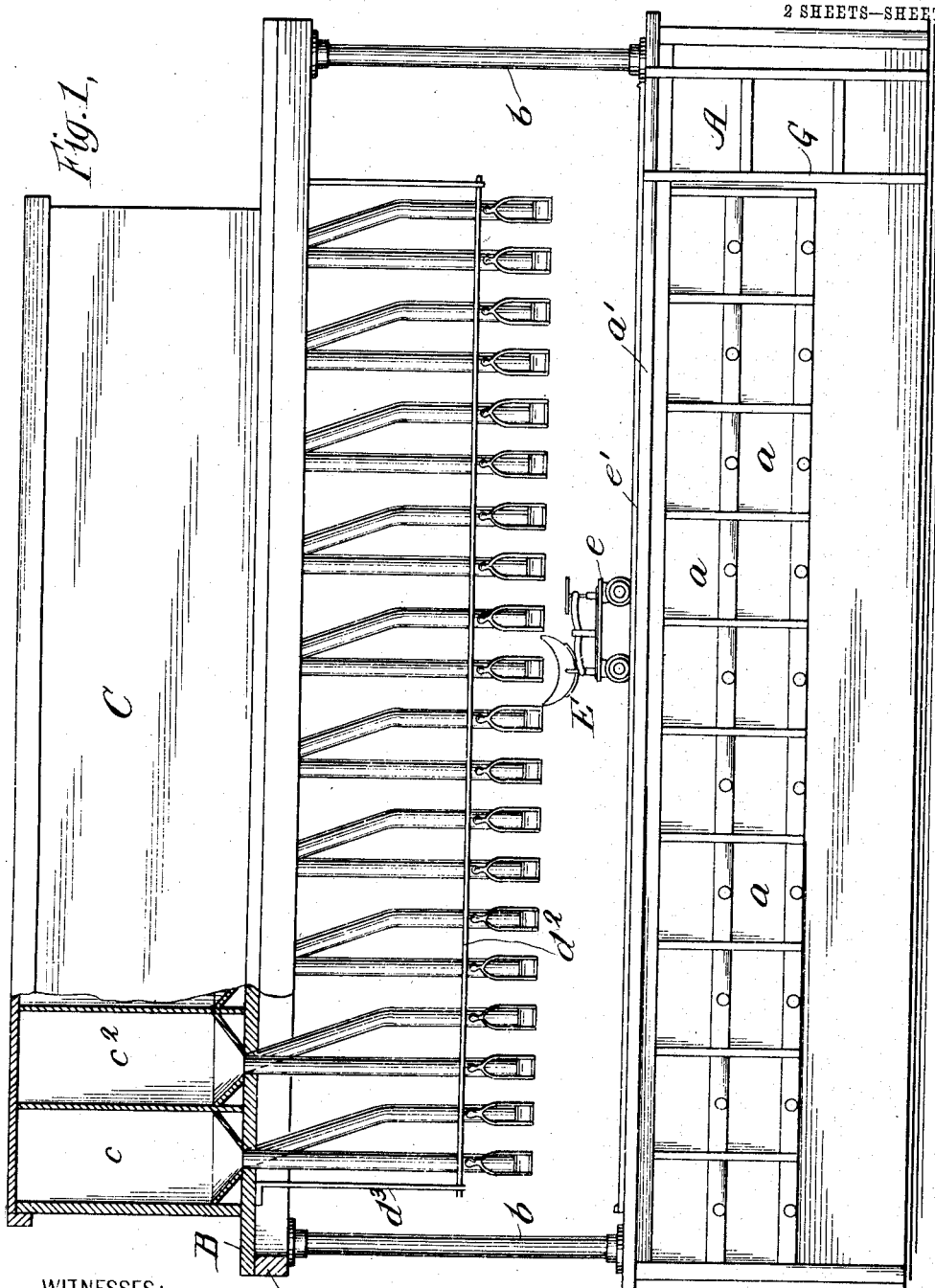

UNITED STATES PATENT OFFICE.

EMMETT TALBERT, OF FRESNO, CALIFORNIA.

DISPENSING APPARATUS.

No. 813,027. Specification of Letters Patent. Patented Feb. 20, 1906.

Application filed July 13, 1904. Serial No. 216,337.

*To all whom it may concern:*

Be it known that I, EMMETT TALBERT, a citizen of the United States, residing at Fresno, in the county of Fresno and State of California, have invented certain new and useful Improvements in Dispensing Apparatus, of which the following is a specification.

My invention relates to dispensing apparatus designed more particularly for use in connection with dry substances, materials, or commodities, though it may be used to advantage in dispensing liquids, or both liquids and dry substances, materials, or commodities.

I will describe a dispensing apparatus embodying my invention and then point out the novel features thereof in claims.

In the accompanying drawings, Figure 1 is a view, partly in front elevation and partly in vertical section, of a dispensing apparatus embodying my invention. Fig. 2 is an end view, partly in section and partly in elevation, seen from the right-hand side of Fig. 1. Figs. 3, 4, and 5 are each detail views showing a form of cut-off embodied in the apparatus and drawn to a scale larger than Figs. 1 and 2. Fig. 6 is a detail in side elevation, showing the connection between the lever and the valve-plate and carrier.

Similar letters of reference designate corresponding parts in all of the figures.

Referring to the drawings, A designates what may be termed a "counter." Drawers $a$ or other compartments, either movable or stationary, may be provided beneath the top $a'$ of the counter.

B designates a shelf or support located above the counter A and mounted on and secured to standards $b$, which in turn are secured to the counter A. Preferably a framework $b'$ of suitable material and construction will be secured to the upper ends of the standards $b$ and the shelf or support secured to the framework.

C designates a bin or other suitable casing, which, as here shown, is provided with a plurality of partitions to form a number of compartments $c$ $c'$ $c^2$, &c. Instead there may be a plurality of such compartments suitably mounted on and secured to the shelf B. The lower end or bottom of each compartment is tapered or converged to an opening $d$, and secured in each opening is a pipe or conduit $d'$, which serves as a chute to convey the substance within the compartment to a lower level. Preferably the delivery ends of the chutes $d^4$ will be in the same vertical plane. Some of the chutes, therefore, intermediate their ends, will extend in an angular direction from their compartments. The purpose of having the delivery end of all the chutes in the same vertical plane is, first, for convenience, and, second, that a single scale or other measuring device traveling on a track may be employed. The delivery ends of the chutes $d'$ are here shown as passing through a shelf $d^2$, which also acts as a brace, and held in position by braces $d^3$, extending from the framework $b'$.

E designates a scale or any other form of measuring device and is shown as being mounted on a platform $e$, provided with rollers which travel on tracks $e'$. The tracks are located on the counter A and are so arranged that the scale E may be brought under any and all of the delivery ends of the chutes $d'$.

F designates a gate or valve device, one being provided on the delivery end of each chute $d'$. As shown in the drawings, each device comprises a sleeve $f$, which fits over the end of the delivery-chute and is suitably secured thereto, a valve-plate $f'$, a carrier $f^2$ for the valve-plate, and a forked lever $f^3$, by means of which the valve-plate $f'$ and carrier $f^2$ are moved. The carrier $f^2$ is hollowed out and is provided with pins or studs over which spiral springs $f^6$ are placed. The springs act to center the valve-plate and to assure a tight fit of the plate over the lower end of the sleeve. The lower ends of the arms of the lever are pivotally connected to the carrier $f^2$, and each arm is slotted in the direction of its length, as indicated at $f^{10}$. Pins $f^{11}$ project from the valve-plate $f'$ into these slots, and by this arrangement the lever will move the valve-plate $f'$ and carrier $f^2$ positively and simultaneously without imposing any strain upon the springs $f^6$, and the slot-and-pin connection between the lever-arms and the valve-plate will permit the latter to readily adjust itself under the influence of the springs $f^6$ to compensate for wear between it and the end of the sleeve. The arms of the lever are hinged on a pin $f^4$, which extends through the sleeve, and are connected at their upper ends to a handle $f^5$. It will be observed that a plurality of springs $f^6$ are employed, respectively engaging the carrier and valve-plate at different points and each acting independently, and this arrangement insures a more accurate adjustment of the valve-plate to its seat in the event of unequal wear between them than would be possible if only a single spring were employed. The sleeve $f$ is also provided with a receptacle or cup $f^8$, the bottom of which serves as a surface for the valve-plate to move over when the lower end of the sleeve is to be opened. The receptacle and sleeve may be integral. The purpose of the receptacle or cup is to hold any overweight or surplusage of the substance of that compartment taken from the scale. Preferably the receptacle will be provided with an opening $f^9$, through which the substance therein may escape upon the next operation of the valve device to withdraw a portion of the substance from the compartment. This opening $f^9$ is located adjacent the bore of the sleeve and preferably does not extend into the bore, though it may. For convenience in filling the compartments a ladder or steps G may be provided.

The operation of the apparatus will be readily understood. The platform and scale may be moved along the track beneath any chute, and when so placed the valve device is operated to permit a portion of the substance to flow under the influence of gravity into the scale-pan or other measuring device. As soon as a sufficient quantity has flowed into the scale-pan the valve device is operated to shut off the further flow of the substance. Should there be any overweight or surplusage of the substance, the overweight or surplusage is put into the cup or receptacle of the valve device just operated, from which it may be removed either by a scoop or, if an opening is provided in the cup or receptacle, it will flow into the scale pan or receptacle upon the next operation of the valve device.

The dispensing apparatus herein described is adapted for use in grocery and drug stores, in laboratories, or in any other place where it is desired to dispense substances which will flow under the influence of gravity.

What I claim as my invention is—

1. In a dispensing apparatus the combination with a plurality of compartments, a delivery-chute for each compartment, a valve device for each delivery-chute comprising a valve-plate, and a cup or receptacle for each delivery-chute provided with an opening, which opening is controlled by the valve-plate.

2. In a dispensing apparatus the combination of a receptacle, a delivery-orifice for said receptacle, an auxiliary receptacle, a delivery-orifice for said auxiliary receptacle, and a valve adapted to control both of said orifices.

3. In a dispensing apparatus the combination of a receptacle, a delivery-chute for said receptacle, a valve-plate engaging the end of the chute, a carrier, a lever pivoted on the chute and pivotally connected to the carrier, slot-and-pin connections between the lever and valve-plate, and a plurality of springs between the valve-plate and the carrier.

4. In a dispensing apparatus the combination of a main receptacle having a delivery-orifice, an auxiliary receptacle having a delivery-orifice adjacent to but independent of that of the main receptacle, and a spring-seated valve-plate for controlling the discharge from both orifices.

In testimony whereof I have hereunto signed my name in the presence of two subscribing witnesses.

EMMETT TALBERT.

Witnesses:
   H. P. BAUMGAERTNER,
   O. GIBBS.